Patented Mar. 3, 1936

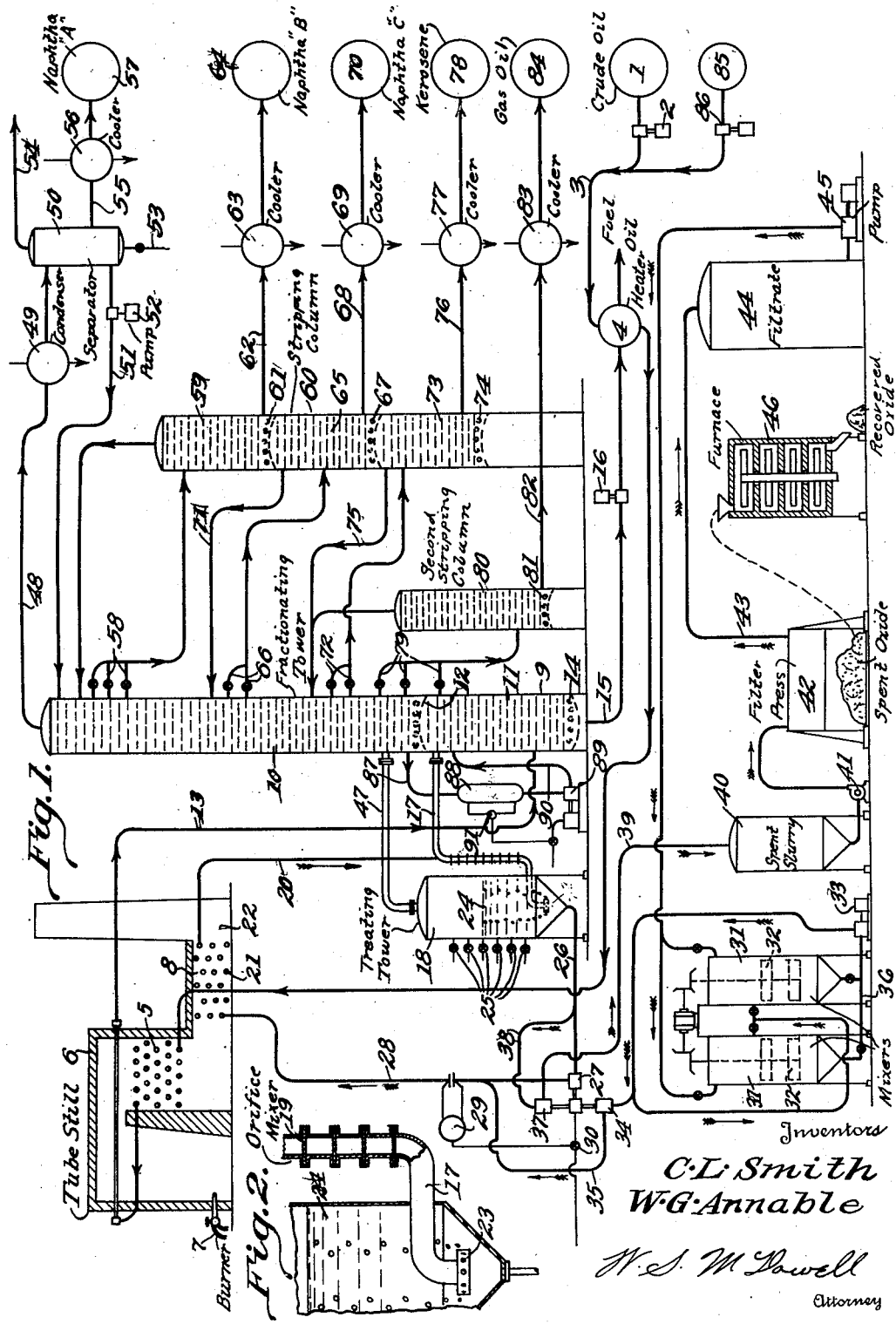

2,032,896

UNITED STATES PATENT OFFICE 2,032,896

METHOD OF FRACTIONALLY DISTILLING AND DESULPHURIZING CRUDE OIL

Clyde L. Smith, Chicago, Ill., and Weldon G. Annable, Linwood, Pa., assignors to The Pure Oil Company, Chicago, Ill., a corporation of Ohio Application December 31, 1932, Serial No. 649,722

9 Claims. (Cl. 196—28)

This invention relates to the treatment of crude hydrocarbon oils, especially mineral oils having a naturally high sulphur content, such as those characteristic of the Michigan and other comparable fields, whereby to provide an economical, effective and continuous system for simultaneously fractionally distilling and desulphurizing oils of the type indicated.

An object of the invention resides in the provision of a system for distilling hydrocarbon oils of the sulphur-bearing type wherein the oils charged to the system are first heated sufficiently to effect vaporizing of the vaporizable constituents thereof without substantially cracking the oils, and wherein provision is made for bringing the vapors of such distillation into intimate and sustained contact with a circulating body of a treating agent, usually in the form of copper oxide, to the end of enabling the treating agent to react with the vaporized oils to procure a chemical combination of the sulphur compounds present in the vapors with the treating agent, and the resulting extraction of such sulphur compounds from the vapors, the desulphurized vapors being subsequently fractionally condensed into oils of different boiling range.

We are aware of the fact that it has been proposed heretofore to desulphurize mineral oils with the use of copper oxide but it is one of the important objects of the present invention to accomplish this result in a more effective, expeditious and continuous manner in apparatus suitable for use in commercial refineries wherein a relatively large throughput of the oil to be treated and fractionally distilled is necessary, and to accomplish the operation with a higher degree of uniformity than has existed heretofore in analogous operations and with the employment or utilization of minimum quantities of copper oxide per barrel of oil treated.

In carrying out the invention, the system embodies a still containing one or more tube banks through which the oil to be treated is passed and subjected to distilling temperatures and in the furnace gas outlet of the still there is arranged another bank of tubes through which is passed for heating purposes the copper oxide, or other equivalent treating agent, in solution or suspension in a liquid carrier, provision being made for circulating the heated mixture of treating agent and liquid carrier in a substantially closed cycle in which vaporized oils discharged from the still are introduced and intimately commingled with the treating mixture to obtain the desired interaction between the copper oxide and the sulphur compounds in the vaporized oils, provision also being made for separating the desulphurized vaporized oils from engagement with the treating mixture and to provide for the subsequent fractionation of said vaporized oils into cuts of controlled boiling range.

It is another object of the invention to provide for the desired intimacy of contact of the vapors with the liquid treating mixture in a thorough, uniform and effective manner while continuously maintaining established circulation of the treating mixture and passage of the oil vapors therethrough, so that there will be no accumulation of obstructing solids in the restricted passages of the system which would tend to obstruct fluid flow through the system or materially interfere with its sustained and continuous operation.

It is a further object of the invention to provide the system with means for continuously introducing added quantities of fresh treating material into the cycle of treating agent circulation and a proportionate withdrawal of spent treating material from said cycle whereby to obtain uniformity in the desulphurizing of the oils continuously charged to the system.

It is a still further object of the invention to provide for the regenerative treatment of the spent treating agent withdrawn from the system so that the said treating agent may at slight expense be returned to the system for reuse therein.

The invention will be more fully understood from the following description, read in connection with the accompanying drawing, in which:

Fig. 1 is a diagrammatic view of apparatus suitable for practicing the present invention;

Fig. 2 is a detail sectional view disclosing the contact zones for bringing the vaporized oils into contact with the treating mixture.

Referring to the drawing, crude oil to be treated is withdrawn from a tank 1 and forced by means of a pump 2 through a pipe line 3. During its passage through the pipe line, the oil enters a heat exchanger 4 where it is brought into indirect heat exchanging relationship with heated residual oils being withdrawn from the system in order that the crude may be preheated, and the heat economy of the system maintained, prior to the passage of the crude through the heating coils 5 of a tube still 6. The tube still may be of any standard design and the internal temperatures thereof obtained through the use of suitable burners 7. The pipe line 3 communicates with the coil 5 adjacent to the furnace gas outlet flue 8 of the still so that the temperature of the oil may be gradually raised during its passage in the form of an elongated stream of restricted cross sectional area through the still. The temperature imparted to the oil during its travel through the coils 5 is sufficient to effect the vaporization of all fractions of such oils which are capable of being vaporized without appreciable molecular decomposition and in this respect the oils and vapors discharged from the still may possess a temperature of the order of 600° to 750° F. At such a temperature, the naphtha, kerosene and gas oil fractions of the crude will be vaporized, leaving as a liquid only the fuel oil fraction.

To separate and treat these fractions, the heated oils and oil vapors discharged from the tube still are passed directly to a fractionating tower 9 which includes upper and lower chambers 10 and 11 respectively which are separated by means of a transverse bulkhead 12 disposed within said tower. The fractionating tower may be of any suitable construction with respect to baffles, trays, temperature controls and the like or, if desired, two fractionating columns may be employed in lieu of the single column, whereby to provide the separate chambers 10 and 11.

The heated oils and vapors released from the tube still enter the lower chamber 11 intermediately of its height through the pipe line 13, and the unvaporized oils gravitate to the base of the chamber 11, where they may be additionally heated by the use of a steam coil 14 located in the bottom of the chamber 11, to insure the removal of all lower boiling and vaporizable constituents from the fuel oil. Connected with the bottom of the chamber 11 is a draw-off line 15 in which is provided a pump 16, by means of which the heated fuel oil is forced through the heat exchanger 4 and then discharged from the system after delivering at least a part of its heat to the incoming crude oil.

The vaporized oils, ranging from light naphtha to gas oil, after being subjected to fractionation in the chamber 11 are released from the upper region of said chamber through a pipe connection 17, and these vaporized oils are then transmitted to the lower portion of a treating chamber or tower 18. The pipe connection 17 is provided with a vertical section formed to constitute an orifice mixer consisting of a plurality of vertically spaced plates 19 having restricted ports or orifices formed therein. Entering this orifice mixer is a pipe line 20, leading from a bank of coils 21 disposed in the furnace gas outlet 22 of the tube still 6. Adapted to be circulated through the coils 21 is a treating mixture composed of a slurry formed from a relatively heavy oil and copper oxide, and this mixture is heated sufficiently, during its passage through the coil 21, so that when said mixture is brought into intimate contact with the oil vapors passing concurrently through the pipe connection 17 and the orifice mixer, there will be no material drop in temperature on the part of said vapors or condensing of desired low boiling constituents.

The pipe connection 17, beyond the orifice mixer, enters the tower or chamber 18 and has its outlet end provided with a drum-shaped head 23, disposed in the conical bottom of the tower 18, the head 23 being formed with horizontal ports, whereby to distribute the mixture of treating agent, oils and vapors as effectively as possible throughout the body of oil or liquid 24 maintained in the bottom of said tower. The level of this body of liquid is subjected to control by means of a plurality of valved draw-off lines 25, arranged at different vertical heights in the sides of the tower. The oil vapors bubble-up through the body of carrier oil and copper oxide maintained in the tower so that the desired intimacy of contact of the oil vapors with the copper oxide is secured. The copper oxide combines with the sulphur compounds present in the oils undergoing treatment to form copper sulphides.

The copper oxide slurry is continuously withdrawn from the bottom of the chamber 18 by way of a line 26 through the operation of a hot oil pump 27 and is returned by that pump through a line 28 to the inlet side of the heating coil 21. The hot oil circulating rate is maintained constant by means of a rate-flow controller 29, arranged in the line 28 and which functions to govern the steam valve 30 regulating the admission of steam to the engine cylinder of the pump 27. In this operation, the copper oxide slurry is circulated in a heated state from the bottom of the treating tower 18 through the hot oil pump 27, thence through the heater 21, which for reasons of economy is preferably arranged in the outlet flue 22 of the housing of the still 6, and from this heater to the orifice mixer 19 in the vapor line 17. The circulation rate in a commercial refinery is about thirty barrels per hour. Fresh copper oxide is introduced into the system at the rate of about one and one-half pounds to each barrel of vaporized oil passed through the slurry. The fresh oxide is thoroughly mixed with a heavy oil (although other liquid carriers may be used) and kept in suspension by agitation into relatively small open topped tanks 31, which tanks are provided with agitators 32. A circulating pump 33 takes suction from the mixing tank which is ready for use and maintains a pressure against the suction side of a small proportioning pump 34 which is attached to the hot oil circulating pump 27. This proportioning pump introduces fresh slurry at a uniform rate, although this rate may be varied from time to time to secure the proper amount of copper oxide necessary for treating. The outlet side of the pump 34 is connected with a pipe line 35 which leads to the line 28, and the bottoms of the tanks 31 are provided with valved outlet lines 36 leading to the suction side of the pump 33.

In order to maintain a constant level of the treating slurry in the tower 18, a second proportioning pump 37 is attached to the hot oil pump 27 and functions to remove a quantity of used slurry at a uniform rate which is directly proportionate to the rate at which fresh slurry is being added by the operation of the pump 34. Thus the suction side of the pump 37 is connected by means of a line 38 with the pipe line 26, and the outlet side of the pump 37 communicates with a pipe line 39 which leads to a reservoir 40 for the spent slurry. From the reservoir 40, the spent slurry is pumped as at 41 through a filter press 42 in order to separate the oxide from the oil or other liquid carrier. The filtrate from this press is transferred by way of a line 43 to a tank 44 and may then be pumped as at 45 back to the tanks or mixing release 31. The oxide removed from this filtrate is then passed through a revolving type furnace 46 similar to those used in burning clay in order to convert the copper sulphide back to the copper oxide for reuse in the system.

*Regeneration of copper sulphide to copper oxide.*

With medium high temperature:

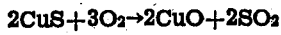

The following reaction takes place if the temperature goes too high.

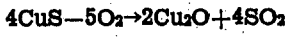

In this way the copper oxide may be used repeatedly for an indefinite period.

The treated or desulphurized vapors released from the upper portion of the treating tower 18 pass through the overhead line 47 to the lower portion of the chamber 10 formed in the main fractionating tower 9 and are fractionated as desired into various grades of naphtha, kerosene and/or gas oil. By reason of the fact that the present invention provides for the heating of the copper oxide slurry, there is little if any drop in temperature of the oil vapors contacted with the slurry, so that no additional reheating of the oils or vapors to fractionating temperatures is necessary following the copper oxide contact.

The fractionating tower 10 may be of any suitable formation but in the present instance, it is shown as having the upper portion thereof provided with a vapor line 48 through which the naphtha A crude is discharged. The line 48 is provided with a condenser 49 arranged ahead of a separator 50, from which may be separately withdrawn fixed gas, water, a reflux oil and end point A naptha. The reflux oil withdrawn from the separator 50 may be returned to the upper portion of the tower 10 for further fractionation and temperature regulation, the returning of the reflux taking place through a pipe line 51, provided with a pump 52. Water withdrawn from the separator is released through an outlet connection 53 in the base of the separator, while the fixed gas is withdrawn from an overhead line 54 communicating with the upper portion of the separator. The end point A naphtha passes from the separator through a line 55 to an after-cooler 56 and thence to a receiving tank 57.

The next cut of higher boiling range may be referred to as the naphtha B crude. This crude or fraction is withdrawn in a substantially liquid state from the upper portion of the tower 10 through any one of a plurality of lines 58 and conducted to the upper chamber 59 of a stripping column 60. The bottom of the chamber 59 may be provided with a steam coil 61 to release entrained lower boiling compounds. Liquid oil, constituting the naphtha B crude, is withdrawn from the bottom of the chamber 59 and transferred by means of a pipe line 62 to a cooler 63 and thence to a storage tank 64.

Below the chamber 59, the stripping column is provided with an intermediate chamber 65 from which may be withdrawn the so-called naphtha C. Below the pipe lines 58, the fractionating tower 10 is provided with a multiplicity of corresponding draw-off lines 66 by means of which liquid oils of slightly higher boiling range than the oils passing through the connections 58, are withdrawn from the fractionating tower and are delivered to the chamber 65. This chamber may also be provided with a steam coil 67 in the base thereof to liberate low boiling fractions contained in the oils delivered to the chamber 65. The unvaporized oils which collect in the base of the chamber 65 are discharged through a pipe line 68, containing a cooler 69 and delivered to a receiving tank 70. Vapors released in the chamber 65 may be returned to the fractionating column through a pipe line 71.

The kerosene crude is withdrawn from the fractionating tower through pipe lines 72 and transmitted to the lower chamber 73 of the column 60. This chamber is likewise equipped with a steam coil or its equivalent 74 to additionally heat the liquid oils delivered to the chamber 73 to release their more volatile compounds, such volatile compounds being then transferred by means of the vapor line 75 back to the fractionating tower. Liquid oils which collect in the base of the chamber 73 are removed by way of a line 76 provided with a cooler 77 and are delivered to a storage tank 78.

The gas oil fraction may be withdrawn from the base of the chamber 10 of the fractionating tower and also oil may be withdrawn from the upper portion of the chamber 11 of said tower by way of a plurality of branched pipe connections 79. These connections lead to the intermediate portion of a second oil stripping column 80. In this column, the oils or vapors delivered thereto are fractionated and, if desired, additionally heated by means of the steam coil 81 located in the base thereof. Vapors of lower boiling oils are released from the upper portion of the column 80 and are returned to the tower section 10 by way of the line 75, while the higher boiling oils, which collect in the bottom of the tower 80, are passed by means of a line 82 through a cooler 83 to a gas oil tank 84. It will be noted that the connections 79 are so arranged that oils or vapors can be taken off either above or below the bulkhead 12 of the tower 9, so that such oils may be treated or untreated with copper oxide as desired. All of the material which passes through the treating tower 18 is recovered in a refined state and requires no further chemical treatment. If desired, lime may be introduced into the crude oil flowing through the pipe line 3. The lime may be contained in a tank 85 and pumped as at 86 into the crude oil line 3.

As shown in Fig. 1, reflux oil in the bottom of the tower section 10 may be withdrawn through a pipe line 87 and delivered to a reservoir 88. This reservoir is connected with the suction side of a pump 89 and a pipe line 90 leads from the discharge side of said pump to the upper portion of the section 11 of the fractionating tower 9. The operation of the pump 89 may be governed by a liquid level controller 91, which functions upon the attainment of a certain liquid level in the reservoir to start or stop the operation of the pump 89 through the regulation of the steam admission line of the pump.

The present description should be construed as covering the removal and conversion of sulphur compounds present not only in crude petroleum but other hydrocarbon oils by means of metallic oxides or salts, while copper oxide has been described as being the preferred reagent to employ in this capacity, and it will be understood that other reagents or catalysts of a substantially equivalent character may be used. As stated, the process is applicable to hydrocarbon oils other than petroleum and its derivatives. Preferably, the reagent used should be substantially free from moisture and in a fine state of subdivision. In accordance with the invention, such an agent, which is capable of combining with sulphur compounds, contained in the oils under treatment, is preferably suspended or dissolved in the hydrocarbon oil or other liquid carrier. The invention then comprises heating the mixture of liquid and treating reagent to a suitable temperature and contacting the same for the proper length of time with the oil vapor to be treated, then passing the treated oil vapors to either a condensing or fractionating column, recirculating the treating mixture and withdrawing the spent treating agent from the system. The invention also comprises the separation of the spent reagent from the mixture, reclaiming the reagent and reusing the suspending medium.

In view of the foregoing, it will be seen that the present invention provides a continuous, efficient and economical process whereby sulphur-containing crude or other oils may be simultaneously fractionally distilled and desulphurized. This treatment is accomplished expeditiously, using novel fractionating equipment and accompanied by low operating and treating costs. It will be understood, however, that the particular disclosure of the invention as above given is merely illustrative and applicable to but one of the preferred forms of the present invention and that the latter is subject to considerable variation and modification without departing from the features and scope of the invention as such are defined in the following claims.

What is claimed is:

1. The method of desulphurizing crude oils, which consists in continuously passing such oils through a tube still maintained at temperatures sufficiently high to substantially vaporize all fractions of such oils which are capable of being vaporized without appreciable molecular decomposition, removing the heated oils and vapors from the tube still and fractionating the same to separate the vaporized oils from the heavier unvaporized oils, passing the vaporized fraction through a confined treating zone and bringing the same in said zone into intimate contact with circulating bodies of copper oxide dissolved or suspended in high boiling liquid oil, whereby to enable said copper oxide to combine with the undesired sulphur compounds present in the oil vapors to remove such compounds through their combination with the copper oxide, fractionating and condensing the desulphurized oil vapors following their release from the upper portion of the treating zone, collecting unvaporized liquid oil and treating agent in the bottom of said treating zone, heating the mixture of the treating agent and unvaporized oil, returning said heated mixture to the treating zone for reuse therein, withdrawing spent treating materials from the system, and supplying fresh treating material to the system in amounts proportionate to the withdrawal of the spent material.

2. The method of refining and fractionating hydrocarbon oils which comprises continuously vaporizing the oil, contacting the vapors with a desulphurizing agent suspended in high boiling liquid oil heated to substantially the temperature of the vapors, passing the treated vapors into a fractionating zone, withdrawing a plurality of liquid fractions from said fractionating zone, continuously withdrawing a portion of the spent desulphurizing agent suspended in oil from the system, separating the oil from the spent reagent, mixing the separated oil with active reagent and returning the mixture to the system for contact with vapors, regenerating the spent reagent and again suspending the regenerated reagent in oil and recirculating the suspended reagent to the system for treatment of further quantities of vapors.

3. Method according to claim 2 in which the reagent is copper oxide.

4. The method of treating oil which comprises heating the oil to vaporizing temperature, vaporizing the lighter fractions thereof, suspending a desulphurizing agent in a high boiling oil, heating the suspension to a temperature sufficiently high to prevent substantial condensation of said vapors but insufficient to cause substantial vaporization of the high boiling oil, contacting said vapors with said suspension, subsequently fractionating the vapors into a plurality of oils of different boiling ranges, continuously withdrawing a portion of the spent treating reagent in suspension from the system, continuously adding active treating reagent in suspension to the system, automatically proportioning the amount of active reagent added to the amount of spent agent withdrawn, separating the oil from the spent reagent, mixing the separated oil with active treating reagent and recirculating it back to the system, regenerating the spent treating agent, again suspending the regenerated reagent in high boiling oil and recirculating the suspension back to the system.

5. Method according to claim 4 in which the treating reagent is copper oxide.

6. The method of treating oil which comprises heating oil in a restricted stream to a temperature sufficient to vaporize the lighter fractions without cracking, passing the heated oil into a vaporizing chamber withdrawing vapors and passing the withdrawn vapors through a treating zone, continuously suspending a desulphurizing reagent in a high boiling point oil, heating the suspension in a restricted stream to a temperature approximately the temperature of said vapors, contacting the vapors with the suspension in the treating zone, fractionating the treated vapors to obtain a plurality of fractions, continuously withdrawing a portion of the spent reagent in suspension from the system, continuously adding active reagent in suspension to the system, automatically proportioning the amount of active reagent added to the amount of spent reagent withdrawn, separating the oil from the spent reagent, suspending active reagent in the separated oil and recirculating the latter suspension to the system, regenerating the spent reagent and suspending the regenerated reagent in high boiling oil and recirculating the regenerated reagent to the system.

7. The method of treating oil which comprises heating oil in a restricted stream to a temperature sufficient to vaporize the lighter fractions without cracking, passing the heated oil into a vaporizing chamber withdrawing vapors and passing the withdrawn vapors through a treating zone, continuously suspending a desulphurizing reagent in a high boiling point oil, heating the suspension in a restricted stream to a temperature approximately the temperature of said vapors, contacting the vapors with the suspension in the treating zone, fractionating the treated vapors to obtain a plurality of fractions, continuously withdrawing a portion of the spent reagent in suspension from the system, continuously adding active reagent in suspension to the system, separating the oil from the spent reagent, suspending active reagent in the separated oil and recirculating the latter suspension to the system, regenerating the spent reagent and suspending the regenerated reagent in high boiling oil and recirculating the regenerated reagent to the system.

8. The method of refining hydrocarbon oil which comprises continuously passing oil in a restricted stream through a furnace wherein the oil is heated to vaporizing temperature, passing the heated oil into a vaporizing chamber wherein the lighter fractions are vaporized, passing the vapors through a body of heavy oil heated to a temperature sufficient to prevent substantial condensation of vapors, said body of oil having suspended therein a desulphurizing agent, fractionating the vapors after contact with said desulphurizing agent to recover gasoline and heavier fractions, continuously withdrawing said heavy oil and spent reagent from said body, separating the oil from the spent reagent, mixing fresh reagent with said separated oil, heating said oil and fresh reagent by means of waste gases from said furnace to a temperature sufficiently high to prevent substantial condensation of said vapors, and contacting said vapors with the heated oil and fresh reagent.

9. Method according to claim 8 in which the amount of fresh reagent added is automatically proportioned to the amount of spent reagent withdrawn.

CLYDE L. SMITH.
WELDON G. ANNABLE.